United States Patent [19]

Mikami

[11] Patent Number: 4,683,251

[45] Date of Patent: Jul. 28, 1987

[54] ROOM TEMPERATURE-CURABLE ORGANOPOLYSILOXANE COMPOSITION CONTAINING A PHOTOSENSITIZER

[75] Inventor: Ryuzo Mikami, Midland, Mich.

[73] Assignee: Toray Silicone Co., Ltd., Tokyo, Japan

[21] Appl. No.: 876,516

[22] Filed: Jun. 20, 1986

[51] Int. Cl.[4] ................................................ C08F 2/13
[52] U.S. Cl. ........................................ 522/46; 522/72;
522/172; 524/315; 524/318; 524/357; 524/359;
524/425; 524/588; 524/770; 524/772; 524/773;
524/775; 524/788; 528/14; 528/16; 528/17;
528/18; 528/19; 528/21
[58] Field of Search ............... 524/588, 770, 772, 773,
524/775, 315, 318, 359, 357, 425, 788; 528/14,
17, 18, 19, 16, 21; 522/172, 72, 46

[56] References Cited

U.S. PATENT DOCUMENTS 4,174,307  11/1979  Rowe ..................................... 528/48
4,341,842   7/1982  Lampe ................................. 524/772

*Primary Examiner*—Melvyn I. Marquis
*Attorney, Agent, or Firm*—Roger H. Borrousch

[57] ABSTRACT

Room temperature-curable organopolysiloxane compositions are made from essentially linear organopolysiloxanes having hydroxyl or hydrolyzable end groups, a crosslinking agent, a filler, optionally a curing catalyst, an unsaturated ester having at least ten carbon atoms in the unsaturated fatty acid component of the ester, and a photosensitizer. These compositions cure to elastomeric materials which do not soil on the surface or the surrounding areas of the substrate in contact with the cure product. The adhesion of these cured products is not reduced.

9 Claims, No Drawings

ROOM TEMPERATURE-CURABLE ORGANOPOLYSILOXANE COMPOSITION CONTAINING A PHOTOSENSITIZER

BACKGROUND OF THE INVENTION

1. Field of Utilization in Industry

The present invention describes a room temperature-curable organopolysiloxane composition. More specifically, the present invention describes a room temperature-curable organopolysiloxane composition whose surface after curing resists soiling and which will not soil substrates in contact with the cured product.

2. Prior Art

Room temperature-curable organopolysiloxane compositions, and particularly organopolysiloxane compositions which cure at room temperature into rubbery materials, have been used in a broad range of applications such as electric insulating materials, molding materials, hermetic sealants, and sealing materials.

However, when these room temperature-curable organopolysiloxanes are applied as above, they are readily soiled due to the adsorption or adhesion of dust. In particular, when used as construction sealing agents on the exterior of structures, low molecular weight organopolysiloxanes gradually migrate from the cured silicone rubber into the structure's wall surface in the vicinity of the composition and adsorb dust. As a result, the aesthetics of the structure are degraded.

A method has been proposed for eliminating this drawback by adding a surfactant, such as a sodium alkylbenzenesulfonate, polyoxyalkylene compound or polyoxyalkyleneorganopolysiloxane copolymer, to the room temperature-curable organopolysiloxane composition in Japanese Kokai [Laid Open] Patent Publication No. 56-76453 [81-76453], published June 24, 1981, and Japanese Patent Publication No. 56-76452 [81-76452], published June 24, 1981.

PROBLEMS IN THE PRIOR ART

However, the above method suffers from the drawback that the addition of surfactant in a quantity sufficient to prevent soiling, significantly reduces the adhesiveness, an essential property of a construction sealing agent. Also, there is an additional drawback, inadequate stainproofing effect.

Various methods were examined by the present inventor in order to eliminate the above-mentioned drawbacks to the prior art and the present invention was developed as a result. Thus, the goal of the present invention is to provide a room temperature-curable organopolysiloxane composition whose cured silicone rubber surface will be difficult to soil, and which will significantly prevent soiling of the surrounding areas of the substrate brought into contact with said silicone rubber and which will not suffer from a reduced adhesiveness.

SUMMARY OF THE INVENTION

This invention relates to a room temperature-curable organopolysiloxane composition comprising (a) 100 parts by weight of an essentially straight-chain organopolysiloxane having silanol or silicon-bonded hydrolyzable groups at the molecular chain ends and having a viscosity at 25° C. in the range of 0.0001 to 1.0 m$^2$/s, (b) 0.1 to 40 parts by weight of a crosslinking agent consisting of an organosilicon compound having at least two silicon-bonded hydrolyzable groups per molecule, (c) 5 to 400 parts by weight of a filler, (d) optionally a curing catalyst, (e) 0.1 to 50 parts by weight of an ester compound derived from unsaturated fatty acids having at least ten carbon atoms and alcohols, and (f) 0.01 to 20 parts by weight of a photosensitizer.

DESCRIPTION OF THE PREFERRED EMBODIMENTS

The essentially straight-chain organopolysiloxane with silanol groups or silicon-bonded hydrolyzable groups at the molecular terminals, designated as component (a), is the principal component of the composition of the present invention. Essentially straight-chain means either completely linear or that branch structures may be present in part, such as polydiorganosiloxane.

The type of organic group bonded to the silicon atoms in said organopolysiloxane is unrestricted and examples thereof are alkyl groups such as methyl, ethyl, propyl, and butyl; cycloalkyl groups such as cyclopentyl and cyclohexyl; alkenyl groups such as vinyl and allyl; aryl groups such as phenyl, tolyl, and naphthyl; aralkyl groups such as 2-phenylethyl and these groups in which part or all of the hydrogen atoms have been substituted by halogen atoms. The molecular chain ends of this component are preferably silanol or alkoxy groups, but may be hydrolyzable groups such as silicon-bonded acyloxy, ketoximo, amino, aminoxy, amido, or alkenyloxy groups.

The viscosity of said organopolysiloxane at 25° C. is 0.0001 to 1.0 m$^2$/s and preferably 0.001 to 0.05 m$^2$/s for the following reason. When the viscosity is below 0.0001 m$^2$/s, the cured silicone rubber will be brittle and cannot have good physical properties. When the viscosity is above 1.0 m$^2$/s, the viscosity of the resulting composition is too high and its workability becomes poor. Component (a) may be a single species or a mixture of two or more species of different types or with different molecular weights. The preferred polydiorganosiloxane (a) is a polydimethylsiloxane, especially those having a viscosity at 25° C. from 0.001 to 0.02 m$^2$/s.

The crosslinking agent constituting component (b) condensation reacts with component (a) to cure the composition of the present invention. This crosslinking agent is an organosilicon compound which contains at least two silicon-bonded hydrolyzable groups in each molecule. However, when the molecular chain ends of component (a) are hydrolyzable groups and not silanol groups, the crosslinking agent can be a silanol-containing organosilicon compound.

These hydrolyzable groups are exemplified as described for component (a) and are acyloxy groups such as acetoxy, octanoyloxy, and benzoyloxy; ketoximo groups such as dimethylketoximo, methylethylketoximo, and diethylketoximo; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy and diethylaminoxy; and amido groups such as N-methylacetamido, N-ethylacetamido, and N-methylbenzamido. In addition to these examples, any crosslinking agent known from the art for room temperature-curable silicone rubbers may be employed.

This component (b) is not particularly restricted as long as it contains at least two hydrolyzable groups selected from the above in each molecule. Groups other than hydrolyzable groups may be bonded to the silicon. The molecular structure is a silane or siloxane structure. In addition, siloxane structures may be straight chain, branched chain, or cyclic.

Examples of groups other than the hydrolyzable groups are alkyl groups such as methyl, ethyl propyl, and butyl; cycloalkyl groups such as cyclopentyl and cyclohexyl; alkenyl groups such as vinyl and allyl; aryl groups such as phenyl, tolyl, and naphthyl; aralkyl groups such as 2-phenylethyl; iminoalkyl groups such as

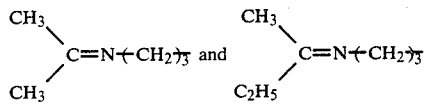

and these groups in which part or all of the hydrogen atoms have been substituted by halogen atoms.

Component (b) is used at 0.1 to 40 parts by weight and preferably 1 to 20 parts by weight per 100 parts by weight of component (a) for the following reason. When this quantity is less than 0.1 part by weight, the produced composition tends to gel during production or storage and the silicone rubber product cannot have the desired properties. On the other hand, when this quantity exceeds 40 parts by weight, the produced composition has a large shrinkage in curing, an extremely slow curing rate, and the silicone rubber product will have a reduced elasticity. Thus, the physical properties of the cured product are reduced both for too large and too small quantities of addition of component (b). Component (b) may be a mixture of two or more species.

The filler comprising component (c) serves to impart the necessary strength to the silicone rubber which is the cured product of the composition of the present invention. It is advantageously an inorganic filler, but organic fillers can also be employed. Examples of the fillers are fumed silica, precipitated silica, quartz, diatomaceous earth, titanium oxide, aluminum oxide, lead oxide, iron oxide, carbon black, bentonite, graphite, calcium carbonate, mica, clay, glass beads, glass microballoons, volcanic ash, carbon fibers, silicon carbide fibers, metal fibers, glass fibers, polyvinyl chloride beads, polystyrene beads, and acrylic beads. The surfaces of the fillers may optionally be treated with organosilane, organosilazane, or cyclic or straight-chain organopolysiloxane. The filler may be a single species or a mixture of two or more species.

Component (c) is used at 5 to 400 parts by weight and preferably 20 to 150 parts by weight per 100 parts by weight component (a) for the following reasons. When this quantity is less than 5 parts by weight, the cured silicone rubber will have poor mechanical strength. On the other hand, when this quantity exceeds 400 parts by weight, the resulting composition has poor workability and the cured silicone rubber is brittle.

The curing catalyst comprising component (d) serves to accelerate the condensation reaction of component (a) with component (b), but this component is not necessarily used depending on the type of crosslinking agent used. For example, this component is not necessarily used when crosslinking agents which contain aminoxy, amino, or ketoximo groups are used. Examples of the curing catalysts which can act as a curing accelerator, are metal salts of organic carboxlic acids such as lead 2-ethylhexoate, dibutyltin dioctoate, dibutyltin diacetate, dibutyltin dilaurate, butyltin 2-ethylhexoate, iron 2-ethylhexoate, cobalt 2-ethylhexoate, manganese 2-ethylhexoate, zinc 2-ethylhexoate, stannous caprylate, tin naphthenate, tin oleate, tin butyrate, titanium naphthenate, zinc naphthenate, cobalt naphthenate, and zinc stearate; organotitanate esters such as tetrabutyl titanate, tetra-2-ethylhexyl titanate, triethanolamine titanate, and tetra(isopropenyloxy) titanate; organotitanium compounds such as organosiloxytitanium and beta-carbonyltitanium; alkoxyaluminum compounds; amine compounds and their salts such as hexylamine and dodecylamine phosphate; quaternary ammonium salts such as benzyltriethylammonium acetate; lower fatty acid salts of alkali metals such as potassium acetate, sodium acetate, and lithium acetate; dialkylhydroxylamines such as dimethylhydroxylamine and diethylhydroxylamine and organosilicon compounds with guanidyl groups such as

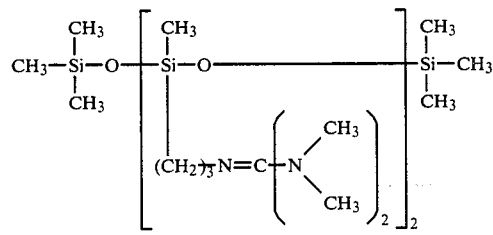

Said curing catalyst is not limited to a single species, but may be a mixture of two or more species in practical application.

Component (d) is generally added at 0.01 to 5 parts by weight and preferably 0.1 to 3 parts by weight per 100 parts by weight component (a) for the following reasons. When the quantity of component (d) is too small, it is difficult to cure the deep sections of the composition uniformly at the time of curing. On the other hand, when this quantity is too large, skinning occurs very rapidly and this causes various problems in practical operations. Also, the heat resistance or weather resistance of the cured silicone rubber deteriorates.

Component (e) is an ester compound which is principally composed of the esters of unsaturated higher fatty acids with alcohols. A stainproofing effect is acquired with the use of component (e) alone, as described in my copending application Ser. No. 876,546 filed on even date herewith, entitled "Room Temperature-Curable Organopolysiloxane Composition" and assigned to the same assignee. However, by joint use with the component (f) described below, it is the important component for an even more significant prevention of soilage of the cured product of the composition of the present invention and prevention of soilage in the vicinity of the cured product. This may be caused by the photochemical reaction of the unsaturated groups of component (e) with component (f) acting as photosensitizer, but the details of the mechanism are unkown.

The unsaturated higher fatty acids to be used for component (e) are the $\geq C_{10}$ compounds containing one unsaturated group and one carboxyl group, or one unsaturated group and several carboxyl groups, or several unsaturated groups and one carboxyl group, or several unsaturated groups and several carboxyl groups.

The unsaturated higher fatty acid esters which are the principal component of component (e) most preferably constitute almost 100 wt % of the total quantity of component (e), but should be at least 80 wt %. In addition to said principal component, ester compounds of <$C_{10}$ unsaturated fatty acids, ester compounds of saturated fatty acids, alcohols, unsaturated fatty acids, and saturated fatty acids may be present.

Component (e) is exemplified by those ester compounds which are the condensation reaction products of higher unsaturated fatty acids, such as oleic, linoleic, linolenic, oleostearic, licanic, ricinoleic, and arachidonic acids, with alcohols selected from among the monohydric alcohols such as methanol and ethanol, dihydric alcohols such as ethylene glycol, propylene glycol, and butylene glycol, trihydric alcohols such as trimethylolpropane, glycerol, and trimethylolethane, tetrahydric alcohols such as pentaerythritol, hexahydric alcohols such as sorbitol and organosilicon compounds which contain a hydroxyl group on a silicon-bonded organic group.

As discussed in the above examples, component (e) can be produced by the condensation of an unsaturated higher fatty acid with an alcohol, but the simplest and most favorable components (e) for the purposes of practical applications are those natural fats and oils principally composed of triglyceryl esters, that is glycerol esters of unsaturated higher fatty acids, such as, for examples, linseed oil, tung oil, soybean oil, castor oil, dehydrated castor oil, fish oil, hempseed oil, cottonseed oil, and tall oil.

Component (e) is used at 0.1 to 50 parts by weight per 100 parts by weight of component (a). When the quantity of component (e) is too small, the stainproofing effect is unsatisfactory. On the other hand, when this quantity is too large, the physical properties of the cured composition of the present invention will be significantly reduced. Component (e) is preferably present in an amount of from 1 to 20 parts by weight per 100 parts by weight of component (a).

While the photosensitizer constituting component (f) does not itself have a stainproofing effect, in its joint use with component (e), it is the important component for the even greater demonstration of the stainproofing effect of component (e) by causing the photochemical reaction of the unsaturated groups of component (e).

Component (f) may be any photosensitizer known heretofore and is exemplified by acetophenone, propiophenone, benzophenone, xanthone, fluorenone, benzaldehyde, fluorene, anthraquinone, triphenylamine, carbazole, 3-methylacetophenone, 4-chlorobenzophenone, 4,4'-dimethoxybenzophenone, and N,N,N',N'-tetramethyl-4,4'-diaminobenzophenone. In addition, examples of photosensitizers with excellent miscibility with the instant component (a) are the reaction products of organosilanes or organopolysiloxanes with photosensitizers as disclosed in Japanese Patent Publication No. 48,794/76, published Apr. 27, 1976, Japanese Patent Publication 44,673/79, published Apr. 9, 1979, Japanese Patent Publication No. 125,204/82, published Aug. 4, 1982, and Japanese Patent Publication No. 131,230/82, published Aug. 14, 1982, and U.S. Pat. No. 4,391,963, issued July 5, 1983, to Akihiko Shirahata.

Component (f) is used at 0.01 to 20 parts by weight per 100 parts by weight of the above component (a) preferably 0.5 to 10 parts by weight of (f) per 100 parts by weight of (a). When this quantity is too small, it cannot cause a sufficient photochemical reaction of component (e), with the result that a satisfactory improved stainproofing effect cannot be obtained for the surface of the cured product of the composition of the present invention or for substrate in contact with said cured product over the use of the unsaturated ester compound alone. When this quantity is too large, the miscibility with component (a) is poor and the physical properties of the cured product accordingly decline.

The present invention is preferably executed by preliminarily dispersing and mixing component (f) into component (a), and by then mixing components (b), (c), (d), and (e), because this provides for the uniform mixing of the relatively small addition of component (f). However, the method of mixing is unrestricted and is in accordance with the normal methods known in the art for room temperature-curable organopolysiloxane compositions.

The composition of the present invention can be stored as to a so-called two-package type, in which the principal component and curing agent are each separately packaged and then mixed immediately prior to use. Alternatively, the composition of the present invention may be stored as a so-called single-package type, in which the principal component, curing agent, and other components are all filled into a single package, a hermetically sealed container such as a cartridge or tube, and then extruded from the container at the time of use. Although the compositions of this invention will cure to elastomeric products which exhibit a resistance to staining, exposure to radiation, especially ultraviolet radiation, including sunshine, will maximize the resistance to staining.

Prescribed quantities of plasticizers, pigments, dyes, flame retardants, thixotropy agents, antimolds, organic solvents, and adhesion-promoting silane coupling agents which contain amino, epoxy, or thiol groups may, as necessary, be added and blended into the composition of the present invention without restriction unless this adversely affects the goal of the present invention.

The invention will be explained using examples of execution. "Parts" in the examples refers to "parts by weight".

EXAMPLE 1

100 Parts of hydroxyl-terminated polydimethylsiloxane (I) with a viscosity at 25° C. of 0.005 $m^2/s$ was mixed to homogeneity with 1 part benzophenone. Into this mixture was then mixed and blended to homogeneity to make a base mixture, 65 parts calcium carbonate and 6 parts linseed oil.

This base mixture was mixed with 5 parts of a mixture (serving as the crosslinking agent) of 90 parts organopolysiloxane with the formula

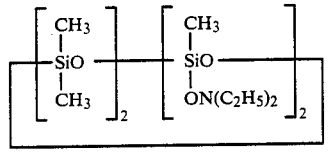

and 10 parts organopolysiloxane with the formula

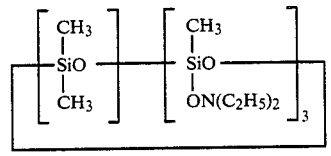

in order to produce a room temperature-curable composition.

For comparison examples, a composition (Comparison Example 1) was prepared as above, but without the linseed oil; a composition (Comparison Example 2) was prepared as above, but without the benzophenone; a composition (Comparison Example 3) was prepared as above, but lacking both the linseed oil and the benzophenone; and a composition (Comparison Example 4) was prepared as above which contains 6 parts of a polyoxyalkylene compound with the formula

instead of the linseed oil. Each composition was filled into a joint (width, 20 mm; depth, 10 mm) between two white ceramic boards placed edge to edge and then cured at room temperature for one week in order to manufacture a test panel. The test panels were allowed to stand outdoors at an inclination of 75° with the joint up. The occurrence of staining on the ceramic boards in the vicinity of the joint was inspected over a 3 month period. The stainproofing effect was evaluated on the following four level scale.
NS: no staining
SS: slight staining
X: significant staining
XX: very significant staining
The mechanical properties in the initial stage of curing were measured according to JIS-A5758 and the results are reported in Table 1.

TABLE 1

| Composition and Properties | Present Invention 1 | Comparison Examples 1 | 2 | 3 | 4 |
|---|---|---|---|---|---|
| Polydimethylsiloxane (I) with molecular terminals end-blocked by hydroxyl groups (parts) | 100 | 100 | 100 | 100 | 100 |
| Benzophenone (parts) | 1 | 1 | — | — | — |
| Calcium carbonate (parts) | 65 | 65 | 65 | 65 | 65 |
| Linseed oil (parts) | 6 | — | 6 | — | — |
| Polyoxyalkylene compound (parts) | — | — | — | — | 6 |
| Crosslinking agent (parts) | 5 | 5 | 5 | 5 | 5 |
| Stainproofing effect (months) | | | | | |
| 0 | NS | NS | NS | NS | NS |
| 1 | NS | X | NS | X | NS |
| 2 | NS | XX | SS | XX | SS |
| 3 | NS | XX | SS | XX | X |
| Stress at 50% elongation (kg/cm²) | 1.8 | 1.8 | 1.7 | 1.8 | 1.4 |
| Maximum strength (kg/cm²) | 8.3 | 8.6 | 7.8 | 8.5 | 6.0 |
| Maximum elongation (%) | 853 | 810 | 875 | 870 | 706 |

The cured product of the present invention, which contains both linseed oil and benzophenone, gave no staining in 3 months, while soiling spread over the entire lower panel in 1 to 2 months with the cured products of Comparison Examples 1 and 3. The cured products of Comparison Examples 2 and 4 had a significant stainproofing effect which, however, was inferior to that of the present invention. Also, Comparison Example 4 had an adhesive strength far inferior to that of the present invention.

EXAMPLE 2

100 Parts of hydroxyl-terminated polydimethylsiloxane (II) with a viscosity at 25° C. of 0.0135 m²/s and 1 part benzophenone were mixed to homogeneity. This mixture was then blended and mixed to homogeneity with 130 parts calcium carbonate and 5 parts or 10 parts of soybean oil to make a base mixture.

This base mixture was then combined with 10 parts of a mixture (acting as the crosslinking agent) of 100 parts organosilane with the formula

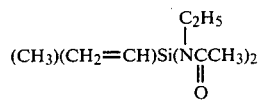

and 20 parts organosilane with the formula

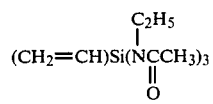

in order to produce a room temperature-curable composition.

The stainproofing effect of this composition was examined by the method described in Example 1.

For comparison, the stainproofing effect of the composition lacking benzophenone, the stainproofing effect of the composition lacking soybean oil, and the stainproofing effect of the composition lacking both soybean oil and benzophenone were examined by the same method as above. The results are reported in Table 2.

The present invention gave no staining after 3 months and so had a superior stainproofing effect over that of the comparison examples.

TABLE 2

| Composition and Properties | Present Invention 2 | 3 | Comparison Examples 5 | 6 | 7 |
|---|---|---|---|---|---|
| Polydimethylsiloxane (II) with molecular terminals end-blocked by hydroxyl groups (parts) | 100 | 100 | 100 | 100 | 100 |
| Benzophenone (parts) | 1 | 1 | 1 | — | — |
| Calcium carbonate (parts) | 130 | 130 | 130 | 130 | 130 |
| Soybean oil (parts) | 5 | 10 | — | 5 | — |
| Crosslinking agent (parts) | 10 | 10 | 10 | 10 | 10 |
| Stainproofing effect (months) | | | | | |
| 0 | NS | NS | NS | NS | NS |
| 1 | NS | NS | X | NS | X |
| 2 | NS | NS | XX | SS | XX |
| 3 | NS | NS | XX | SS | XX |

EXAMPLE 3

One part benzophenone was added to 100 Parts of hydroxyl-terminated polydimethylsiloxane (III) with a viscosity at 25° C. of 0.0123 m²/s and this mixture was then mixed to homogeneity. To this mixture was added 6 parts dehydrated castor oil and 100 parts calcium carbonate, followed by thorough mixing to make a base mixture.

The resulting mixture was then combined with 13 parts vinyltri(methylethylketoximo)silane as the crosslinking agent in order to produce a room temperature-curable composition.

The stainproofing effect of this composition was examined by the method described in Example 1.

For comparison, the stainproofing effect of the composition lacking benzophenone, the stainproofing effect of the composition lacking dehydrated castor oil, and the stainproofing effect of the composition lacking both benzophenone and dehydrated castor oil were examined by the same method as above. The results are reported in Table 3.

The composition of the present invention had an excellent stainproofing effect.

TABLE 3

| | Experiment Number | | | |
|---|---|---|---|---|
| | Present Invention | Comparison Examples | | |
| Composition and Properties | 4 | 8 | 9 | 10 |
| Polydimethylsiloxane (III) with molecular terminals end-blocked by hydroxyl groups (parts) | 100 | 100 | 100 | 100 |
| Benzophenone (parts) | 1 | — | 1 | — |
| Calcium carbonate (parts) | 100 | 100 | 100 | 100 |
| Dehydrated castor oil (parts) | 6 | 6 | — | — |
| Vinyltri(methylethyl-ketoximo)silane (parts) | 13 | 13 | 13 | 13 |
| Stainproofing effect (months) | | | | |
| 0 | NS | NS | NS | NS |
| 1 | NS | NS | X | X |
| 2 | NS | SS | XX | XX |
| 3 | NS | SS | XX | XX |

EXAMPLE 4

100 Parts polydimethylsiloxane (IV) with a viscosity at 25° C. of 0.0155 m²/s and end-blocked with

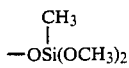

groups was mixed with 1 part benzophenone as the photosensitizer, or with 1 part acetophenone as the photosensitizer, or with 3 parts or 6 parts of the photosensitizer with formula (1) as

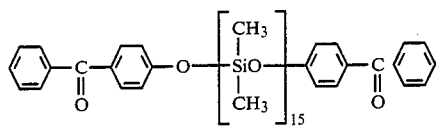

(1)

shown in Table 4. This mixture was then mixed to homogeneity with 70 parts calcium carbonate, 7 parts linseed oil, 5 parts methyltrimethoxysilane as the crosslinking agent and 1.5 parts titanium diisopropoxybis(ethylacetoacetate) as the catalyst. The stainproofing effect of the resulting compositions were examined by the method described in Example 1. In the comparison example, the stainproofing effect of the composition lacking both photosensitizer and linseed oil was examined by the same method as above. The results are reported in Table 4. The composition of the present invention has a significantly improved stainproofing property.

TABLE 4

| | Experiment Number | | | | |
|---|---|---|---|---|---|
| | Present Invention | | | | Comparison Examples |
| Composition and Properties | 5 | 6 | 7 | 8 | 11 |
| Polydimethylsiloxane (IV) with molecular terminals end-blocked by hydroxyl groups (parts) | 100 | 100 | 100 | 100 | 100 |
| Benzophenone (parts) | 1 | — | — | — | — |

TABLE 4-continued

| | Experiment Number | | | | |
|---|---|---|---|---|---|
| | Present Invention | | | | Comparison Examples |
| Composition and Properties | 5 | 6 | 7 | 8 | 11 |
| Acetophenone (parts) | — | 1 | — | — | — |
| Photosensitizer with formula (1) (parts) | — | — | 3 | 6 | — |
| Calcium carbonate (parts) | 70 | 70 | 70 | 70 | 70 |
| Linseed oil (parts) | 7 | 7 | 7 | 7 | — |
| Methyltrimethoxysilane (parts) | 5 | 5 | 5 | 5 | 5 |
| Stainproofing effect (months) | | | | | |
| 0 | NS | NS | NS | NS | NS |
| 1 | NS | NS | NS | NS | X |
| 2 | NS | NS | NS | NS | XX |
| 3 | NS | NS | NS | NS | XX |

EFFECTS OF THE INVENTION

Because the room temperature-curable organopolysiloxane composition of the present invention contains both an ester compound which is principally composed of the esters of unsaturated higher fatty acids with alcohols as well as a photosensitizer, it exhibits the characteristics of a significant suppression of soiling of the surface of the cured product and of soiling of the surrounding areas of the substrate in contact with the cured product, which are both drawbacks of the prior room temperature-curable organopolysiloxane compositions. In addition, the composition of the present invention does not suffer from a reduction in its adhesiveness, and so is suitable as a construction sealing material as well as being useful as a sealing agent, adhesive, or moistureproofing coating agent for electric and electronic parts and as a coating agent or adhesive for textile products, glass products, metal products, and plastic products.

That which is claimed is:

1. A room temperature-curable organopolysiloxane composition comprising
   (a) 100 parts by weight of an essentially straight-chain organopolysiloxane having silanol or silicon-bonded hydrolyzable groups at the molecular chain ends and having a viscosity at 25° C. in the range of 0.0001 to 1.0 m²/s,
   (b) 0.1 to 40 parts by weight of a crosslinking agent consisting of an organosilicon compound having at least two silicon-bonded hydrolyzable groups per molecule,
   (c) 5 to 400 parts by weight of a filler,
   (d) optionally a curing catalyst,
   (e) 0.1 to 50 parts by weight of an ester compound derived from unsaturated fatty acids having at least ten carbon atoms and alcohols, and
   (f) 0.01 to 20 parts by weight of a photosensitizer.

2. The composition according to claim 1 in which the ester compound is selected from the group consisting of linseed oil, tung oil, soybean oil, castor oil, dehydrated castor oil, fish oil, hempseed oil, cottonseed oil, and tall oil.

3. The composition according to claim 1 in which (a) is a polydiorganosiloxane having a viscosity at 25° C. of from 0.001 to 0.05 m²/s, (b) is present in an amount of 1 to 10 parts by weight, (c) is present in an amount of from 20 to 150 parts by weight, (e) is present in an amount of from 1 to 20 parts by weight, and (f) is present in an amount of from 0.5 to 10 parts by weight.

4. The composition according to claim 2 in which (a) is a polydiorganosiloxane having a viscosity at 25° C. of from 0.001 to 0.05 m²/s, (b) is present in an amount of 1 to 10 parts by weight, (c) is present in an amount of from 20 to 150 parts by weight, (e) is present in an amount of from 1 to 20 parts by weight, and (f) is present in an amount of from 0.5 to 10 parts by weight.

5. The composition according to claim 3 in which the curing catalyst of (d) is present in an amount of from 0.01 to 5 parts by weight.

6. The composition according to claim 3 in which the polydiorganosiloxane of (a) is hydroxyl endblocked polydimethylsiloxane having a viscosity at 25° C. of 0.001 to 0.02 m²/s, (b) is a mixture of

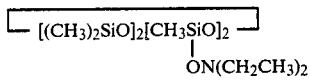

and

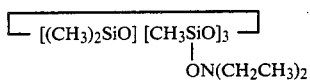

(c) is calcium carbonate, (e) is linseed oil, and (f) is benzophenone.

7. The composition according to claim 3 in which the polydiorganosiloxane of (a) is hydroxyl endblocked polydimethylsiloxane having a viscosity of 25° C. of 0.001 to 0.02 m²/s, (b) is a mixture of methylvinyldi(N-ethylacetamido)silane and vinyltri(N-ethylacetamido)silane, (c) is calcium carbonate, (e) is soybean oil, and (f) is benzophenone.

8. The composition according to claim 3 in which the polydiorganosiloxane of (a) is hydroxyl endblocked polydimethylsiloxane having a viscosity of from 0.001 to 0.02 m²/s, (b) is vinyltri(methylethylketoximo)silane, (c) is calcium carbonate, (e) is dehydrated castor oil, and (f) is benzophenone.

9. The composition according to claim 3 in which the polydiorganosiloxane of (a) is methyldimethoxysiloxy endblocked polydimethylsiloxane having a viscosity at 25° C. of 0.001 to 0.02 m²/s, (b) is methyltrimethoxysilane, (c) is calcium carbonate, (d) is present in an amount of from 0.1 to 5 parts by weight and is titanium diisopropoxylbis(ethylacetoacetate), (e) is linseed oil, and (f) is selected from the group consisting of benzophenone, acetophenone, and

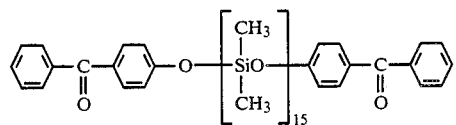

* * * * *